US010186867B2

United States Patent
Premm et al.

(10) Patent No.: US 10,186,867 B2
(45) Date of Patent: Jan. 22, 2019

(54) METHOD AND APPARATUS FOR THE OPERATION OF A POWER STATION OF FLUCTUATING PERFORMANCE CONNECTED, BESIDES A SYSTEM FORMER AND AT LEAST ONE LOAD, TO A LIMITED AC SYSTEM

(71) Applicant: SMA Solar Technology AG, Niestetal (DE)

(72) Inventors: Daniel Premm, Kaufungen (DE); Denis Mende, Kaufungen (DE); Christian Schuetz, Grebenstein (DE)

(73) Assignee: SMA Solar Technology AG, Niestetal (DE)

(*) Notice: Subject to any disclaimer, the term of this patent is extended or adjusted under 35 U.S.C. 154(b) by 188 days.

(21) Appl. No.: 15/459,090

(22) Filed: Mar. 15, 2017

(65) Prior Publication Data

US 2017/0187186 A1     Jun. 29, 2017

Related U.S. Application Data

(63) Continuation of application No. PCT/EP2015/068098, filed on Aug. 5, 2015.

(30) Foreign Application Priority Data

Sep. 15, 2014 (DE) .................. 10 2014 113 262

(51) Int. Cl.
*H02J 3/18* (2006.01)
*H02J 3/38* (2006.01)
(Continued)

(52) U.S. Cl.
CPC ................ *H02J 3/18* (2013.01); *H02J 3/382* (2013.01); *H02J 3/383* (2013.01); *H02J 3/386* (2013.01);
(Continued)

(58) Field of Classification Search
CPC ...... H02J 3/18; H02J 3/386; H02J 3/48; H02J 3/50; H02J 3/383; H02J 3/382;
(Continued)

(56) References Cited

U.S. PATENT DOCUMENTS 9,020,650 B2   4/2015   Luetze et al.
9,366,233 B2   6/2016   Bech et al.
(Continued)

OTHER PUBLICATIONS

International Search Report dated Sep. 17, 2015 PCT/EP2015/068098.
(Continued)

*Primary Examiner* — Robert Deberadinis
(74) *Attorney, Agent, or Firm* — Eschweiler & Potashnik, LLC (57) ABSTRACT

A method and associated apparatus for operating a power station of fluctuating electrical capacity that, besides a voltage-setting system former outputting active power and reactive power and at least one load, is connected to a limited AC grid. The method and associated apparatus includes defining a desired self-contained operating range of the system former on the PQ level, in which operating range the system former is able to efficiently correct fluctuations arising in a mains voltage of the AC grid, ascertaining a present operating point of the system former on the PQ level, and controlling an output of active power and reactive power by the power station such that the operating point of the system former is kept in the desired operating range.

19 Claims, 5 Drawing Sheets

(51) Int. Cl.
*H02J 3/48* (2006.01)
*H02J 3/50* (2006.01)
*H02M 7/44* (2006.01)

(52) U.S. Cl.
CPC ............... *H02J 3/48* (2013.01); *H02J 3/50* (2013.01); *H02M 7/44* (2013.01); *Y02E 10/563* (2013.01); *Y02E 10/763* (2013.01); *Y02E 60/74* (2013.01); *Y04S 10/30* (2013.01)

(58) Field of Classification Search
CPC ..... Y02E 10/563; Y02E 10/763; Y02E 60/74; Y04S 10/30; H02M 7/44
See application file for complete search history.

(56) References Cited

U.S. PATENT DOCUMENTS

2005/0225090 A1 10/2005 Wobben
2015/0198145 A1 7/2015 Diedrichs et al.

OTHER PUBLICATIONS

Carlos A. Hernandez-Aramburo, et al.; Fuel Consumption Minimization of a Microgrid; IEEE Transactions of Industry Applications, vol. 41, No. 3, May/Jun. 2005.
J. H. Walker; Operating Characteristics of Salient-Pole Machines (The paper was first received May 26, and in revised form Aug. 21, 1952.) Paper No. 1411 Supply Section.
Ivan Ilic, et al.; User P-Q Diagram as a Tool in Reactive Power Trade; 2011 8th International Conference on the European Energy Market (EEM)—May 25-27, 2011—Zagrab, Croatia.
Mendis, et al.; A Novel Control Strategy for Stand-Alone Operation of a Wind Dominated RAPS System; 2011 IEEE Industry Applications Society Annual Meeting 12386358, Oct. 13, 2011.

METHOD AND APPARATUS FOR THE OPERATION OF A POWER STATION OF FLUCTUATING PERFORMANCE CONNECTED, BESIDES A SYSTEM FORMER AND AT LEAST ONE LOAD, TO A LIMITED AC SYSTEM

CROSS REFERENCE TO RELATED APPLICATIONS

This application claims priority to International Patent Application number PCT/EP2015/068098, filed on Aug. 5, 2015, which claims priority to German Patent Application number 10 2014 113 262.9, filed on Sep. 15, 2014, and is hereby incorporated by reference in its entirety.

TECHNICAL FIELD

The disclosure relates to a method for operating a power station of fluctuating electrical capacity that, besides a voltage-setting system former outputting active power and reactive power and at least one load, is connected to a limited AC grid. In this case, the operation of the power station frequently serves the purpose of supplying power from the power station in order to reduce a fuel consumption at one or more combustion generators that are used as system formers or further power sources in the limited AC grid.

BACKGROUND

The power station of fluctuating electrical capacity may particularly be a photovoltaic power station, but also, by way of example, a wind, tidal or a cogeneration unit. The "fluctuating" statement with regard to the capacity of the power station means, in this context, that its capacity, i.e. its present ability to output electric power, is determined by external parameters such as insolation, wind activity, tidal range, heat requirement, etc. and fluctuates as a result, specifically irrespective of the present power requirement in the limited AC grid to which the power station is connected.

The limited AC grid is particularly what is known as an island system, which does not have a connection to a superordinate stabilizing AC grid. The system former connected to the AC grid may, however, fundamentally also have a connection of limited power to the superordinate AC grid. The limited AC grid accordingly has no more than one connection of limited power to a superordinate AC grid. Frequently, the system former will be a permanently activated combustion generator that has a constant capacity at the level of its rated or maximum power. Formation of the system former is alternatively also possible by a hydroelectric generator or a battery inverter.

Depending on the power requirement of the loads connected to the AC grid, frequently at least one further power source, particularly a combustion generator, is activated, in addition to the system former, by a power source controller as required. Typically, there are multiple further power sources that are activated by the power source controller in increasing number as required. In this case, the power source controller keeps a reserve power to hand so that the currently activated power sources with an increased power output can react to brief rises in the power consumption of the loads or to an additional power consumption by activating additional loads. Activation of additional combustion generators does not allow these kinds of rapid rises in power consumption.

With any fluctuation in the power consumption for loads, particularly all voltage-setting system formers are given the task of keeping the mains voltage of the AC grid stable, i.e. as constant as possible in terms of amplitude and frequency.

The power station of fluctuating electrical capacity reduces the fuel requirement of all combustion generators connected to the limited AC grid as power sources and any other energy requirement of other power sources connected to the limited AC grid that is not covered by regenerative energy sources by covering part of the power consumption of the connected loads. In this case, it should be borne in mind that the power station of fluctuating electrical capacity does not lead to destabilization of the AC grid by virtue of its supplying power to the AC grid. As such, an uncontrolled supply of power by the power station can lead to power being supplied to activated combustion generators, for example, which normally results in emergency shutdown thereof. This can cause the whole AC grid to collapse.

Combustion generators connected as power sources to the AC grid are typically diesel generators, even if other combinations of an internal combustion engine and a generator, which in this case are referred to as combustion generators for short, are possible. Although diesel generators, when put to appropriate use, have good efficiency and good cost effectiveness, they need a few seconds before they are activated to the extent that they can supply power to the AC grid. The electric power supplied by photovoltaic power stations, for example, can be varied more quickly in principle, even more quickly than in the case of an already activated combustion generator, which is afflicted with considerable mechanical moments of inertia.

A method for operating a photovoltaic power station in order to reduce a power consumption of a diesel generator by supplying power from the photovoltaic power station is described on the website www.donauer.eu of Donauer Solartechnik Vertriebs GmbH. In this case, what is known as DONAUER diesel hybrid energy management is intended to ensure a stable, economical and sustainable supply of energy without the need for batteries as buffer stores for electric power, by virtue of a diesel generator always being operated at an optimum operating point with efficient fuel combustion. More information concerning how this is intended to be achieved is not provided, however.

DE 10 2011 103 600 A1 discloses a method for controlling an installation or machine for the purpose of optimum utilization of an energy source. In this case, the installation or machine can be supplied with power from a photovoltaic power station. The time profile for the power of the photovoltaic power station is forecast, with a cloud cover forecast being produced with the aid of satellites. The installation or machine is then controlled such that it performs a process that is begun at a starting time at which at least a greatest possible portion of the power needed for the process is produced by the photovoltaic power station.

DE 10 2010 046 744 A1 discloses a method for a photovoltaic power station with load management in island mode. A first energy source consisting of an arrangement of photovoltaic modules and of a second energy source supplies to a DC input of an island inverter, the output of which supplies power to an AC load. In this case, the input of electric power is provided solely using the first energy source, as long as the maximum power point on the current/voltage characteristic of the photovoltaic modules has not yet been reached. When the maximum power point and a further consumption load increase in the AC load is reached, the photovoltaic modules continue to be operated at the maximum power point, and the energy input that is missing for the full supply of energy to the AC load is provided by the second energy source. This second energy source may be formed by a public power supply system or by a combustion generator.

DE 10 2011 106 877 A1 discloses an arrangement with a photovoltaic generator that is connectable to the input terminals of an inverter. The output of the inverter is connected to a supply system. The arrangement moreover comprises an asynchronous machine that is connected in parallel with the output of the inverter and that is driven by an internal combustion engine. The aim of the arrangement is to allow the use of asynchronous machines, which are cheap in comparison with synchronous machines and whose unfavorable power factor cos phi is compensated for by reactive power control using electronically regulated IGBTs of the inverter. A combustion generator with an asynchronous machine directly linked to an AC grid is not suitable as a system former. In order to span the period between a time at which power is demanded from the synchronous machine by the operator of the supply system and the time from which the asynchronous machine actually provides the demanded power after the internal combustion engine is started, a battery is therefore provided that is connectable to the input of the inverter.

EP 1 323 222 B1 discloses a method for operating an island system having at least one first energy producer in the form of a wind power station, a synchronous machine as a system former and an electrical element as an intermediate storage. The wind power station is regulated such that it always produces only the electric power needed, which is made up of the consumption of the electric power in the system and the power requirement for charging the electrical element as an intermediate storage. An internal combustion engine that can drive the synchronous machine via a coupling is activated only when the power that is output by the wind power station and/or by the electrical intermediate storage drops below a prescribable threshold value for a prescribable period of time. When the internal combustion engine is not activated, the synchronous machine operates in motor mode, drawing its drive energy from the wind power station. The synchronous machine is not only a system former but is also a reactive power and short-circuit current generator, flicker filter and voltage regulator of the island system.

US 2008/0278003 A1 discloses a system for the uninterruptable supply of power to a load that has a regenerative energy source in the form of a photovoltaic power station and a battery as a storage for electric power. The system maintains the supply of power to the load when an AC grid fails, particularly until a combustion generator is activated as a substitute power supply.

C. A. Hernandez-Aramburo et al.: Fuel Consumption Minimization of a Microgrid" IEEE Transactions on Industry Applications, vol. 41, no. 3, pages 673-681, May/June 2005, discloses a method for operating photovoltaic generators and wind generators that, besides a system former, at least one combustion generator, which is activated or deactivated by a generator controller as required, and at least one load, are connected to a limited AC grid. A cost optimization model, with the secondary condition that a reserve power currently available in the AC grid observes a minimum value, sets the power available from photovoltaic generators and wind generators at 80% and 40%, respectively, of their rated power. To provide a rising power requirement, the photovoltaic generators and wind generators, which require no fuel, are initially run up to their present maximum powers. In order to provide reserve power and in order to cover power requirement that can no longer be covered without fuel, combustion generators are then connected in a combination that is cost-optimized for the respective power requirement. The powers of the photovoltaic generators and wind generators remain at their present maximum powers in this case.

EP 2 503 146 A1 discloses a method and an apparatus for controlling the operation of an energy production installation during isolation from a superordinate AC grid. In concrete terms, this involves an energy production installation that comprises at least one wind power station, and the mode of operation of the energy production installation in the event of failure of the superordinate AC grid, to which energy is supplied otherwise. For this mode of operation, an external generator is connected by means of a cable to auxiliary equipment of the wind power station in order to provide this auxiliary equipment, such as the setting devices for the rotor blades of the wind power station, for example, with active power. A transformer connects the cable not only to the auxiliary setup but also to an inverter of the respective wind power station. The inverter is used to provide reactive power in order to operate the external generator in a stable range of the PQ level, i.e. within the area defined by the possible active power of the generator plotted over the possible reactive power of the generator. The background is that a standard diesel generator can become unstable for particular ratios of active power to reactive power above 20% reactive power for its nominal power and that an acceptable operating range on the PQ level lies approximately between the straight lines representing a power factor of 1.0 and a power factor of 0.8. The reactive power produced using the inverter of the wind power station is used to keep the operating point of the external generator in this range.

SUMMARY

The disclosure is based on the object of demonstrating a method for operating a power station of fluctuating electrical capacity that, besides a voltage-setting system former outputting active power and reactive power and at least one load, is connected to a limited AC grid. On the one hand, as a result of the supply of power by the power station, an energy requirement of the system former, and of other power sources connected to the limited AC grid, that is not covered by regenerative energy sources is admittedly effectively reduced even without the use of batteries as intermediate storage for electric power. On the other hand the limited AC grid is also stabilized with respect to fluctuations in the power consumption of all loads and the power output of the power station.

A method according to the disclosure for operating a power station of fluctuating electrical capacity that, besides a voltage-setting system former outputting active power and reactive power and at least one load, is connected to a limited AC grid and involves a desired self-contained operating range of the system former being defined on the PQ level, in which operating range the system former is able to particularly efficiently correct fluctuations arising in a mains voltage of the AC grid. A present operating point of the system former on the PQ level is then ascertained and an output of active power and reactive power by the power station is controlled such that the operating point of the system former is kept in the desired operating range.

On the PQ level, the possible active power of the system former plotted over the possible reactive power of the system former defines an area. Within this area, there are operating ranges of the system former in which it is not operated, in one embodiment. Even in the operating ranges in which it can be operated in principle, however, there results a different behavior for the respective system former in the event of voltage and frequency fluctuations in the mains voltage arising in the AC grid. It is thus possible to define an operating range for the system former on the PQ level by virtue of the system former particularly efficiently countering fluctuations arising in the mains voltage of the AC grid, i.e. efficiently correcting them to its maximum possible extent, without getting into an unstable operating state in the process. According to the disclosure, the system former is kept in this desired operating range by means of the power station and its supply of active power and reactive power. Hence, the power station makes a considerable contribution to stabilization of the AC grid.

It goes without saying that the self-contained operating range in which the system former is able to particularly efficiently correct fluctuations arising in the mains voltage of the AC grid does not necessarily have to be stipulated graphically in a plot of the active power over the reactive power of the system former. Instead, it is sufficient to define the desired operating range of the system former on the basis of its active power and its reactive power. Any such operating range can be depicted on the PQ level, however. The same applies to the ascertainment of the operating point of the system former. Even if the present operating point is defined other than directly by the active power and reactive power output by the system former, it can be transferred to the PQ level.

The fact that the desired operating range in the case of the method according to the disclosure is self-contained can particularly mean that the desired operating range is not limited by the power boundary of the area that is defined by the possible active power of the system former plotted over the possible reactive power of the system former, but rather its boundaries run at a distance from the power boundary of this area, because the system former, in one embodiment, no longer corrects fluctuations arising in the mains voltage at an operating point on the power boundary in the AC grid on account of increased power requirement.

The option of varying the output of active power and reactive power by the power station such that the operating point of the system former can be shifted and in this way kept in the desired operating range is provided for various known power stations, particularly by virtue of suitable actuation of their inverters.

In principle, there may be an ideal operating point of the system former from which it is able to correct fluctuations arising in the mains voltage of the AC grid with maximum efficiency. In principle, it is also possible for only close surroundings of this ideal operating point to be defined as the desired operating range of the system former. However, in one embodiment the desired operating range is defined to be as large as possible in the direction of the active power in order to supply as much active power as possible to the AC grid using the power station, in order to save as much energy as possible from nonregenerative energy sources. Accordingly, in one embodiment of the method according to the disclosure, while the operating point of the system former remains in the desired operating range, the supply of active power by the power station is maximized.

In the case of the method according to the disclosure, the system former may be a hydroelectric generator or a battery inverter, for example, as an alternative to a combustion generator. Although a hydroelectric generator, in the case of which an electric machine is driven by a water turbine, does not consume nonregenerative energy, it is capable of efficiently correcting fluctuations arising in the mains voltage of the AC grid only when its operating point is kept in a small desired operating range. When a battery inverter is a system former, it is additionally necessary to take into consideration the present state of charge of the connected battery, this being able to be accomplished by a desired operating range of the battery inverter that is dependent on a state of charge. It is also, in principle, not necessary for the desired operating range of the system former to be fixed, but rather it can be stipulated in the case of foreseeable influences on the mains voltage of the AC grid. If, by way of example, it is foreseeable that the need for reactive and/or active power will change in a particular direction, the desired operating range of the system former can be shifted in the opposite direction beforehand in order to provide an additional control reserve for correcting the change in the mains voltage of the AC grid that arises when the change in the power requirement arises.

In particularly worthwhile embodiments of the method according to the disclosure, besides the system former, at least one further power source is connected to the limited electrical supply system, the further power source being activated or deactivated as required. In this case, this activation and deactivation as required is also effected with the proviso of keeping the operating point of the system former in the desired operating range.

Any further power source that is activated or deactivated as required in the method according to the disclosure may likewise be a voltage-setting power source, i.e. a further system former. In one embodiment all voltage-setting power sources are of the same kind, i.e. are able to efficiently correct fluctuations arising in the mains voltage of the AC grid at one and the same operating point on the PQ level, so that a common desired operating range can be defined and observed for all voltage-setting power sources. The further power sources may alternatively all or in some cases be voltage-supporting power sources without a system former function.

In concrete terms, the at least one further power source for the method according to the disclosure may be a combustion generator. However, activating a combustion generator until it is able to supply power to the AC grid requires a certain time. Activation and deactivation of a combustion generator as required is therefore unsuitable for equalizing short-term power fluctuations and resulting fluctuations in the amplitude and frequency of the mains voltage of the AC grid. Rather, this equalization requires a power reserve to be kept to hand in all already activated power sources. Observing the desired operating range of the system former may be sufficient for providing this reserve power, because when the operating point of the system former is in this desired operating range, at least its power is not yet fully exhausted.

When the at least one further power source is activated by a power source controller in the method according to the disclosure, this power source controller itself does not necessarily need to be geared to the method according to the disclosure. Rather, the supply of active power by the power station can be reduced until the at least one or another, further power source is activated by the power source controller when the operating point of the system former leaves the desired operating range for the outside, i.e. for higher powers. The power provided by the newly activated further power source then shifts the operating point of the system former inwards again.

Conversely, when the at least one further power source is deactivated by a power source controller, the supply of power by the power station can be increased until the at least one or the still further power source is deactivated by the power source controller when the operating point of the system former leaves the desired operating range for the inside, i.e. for lower powers.

The method according to the disclosure can involve the reserve power currently available in the electrical supply system also being ascertained in concrete terms, wherein only activated power sources are taken into consideration. When the ascertained reserve power drops below a minimum reserve power, the supply of power by the power station can be reduced until the at least one or another, further power source is activated by the power source controller. This ensures the minimum reserve power in addition to keeping the system former in the desired operating range.

The minimum reserve power is a prescribed value that may be firmly prescribed but that can also be prescribed on the basis of a present need for reserve power. Details in this regard can be found further below. The activation of each additional power source increases the reserve power available in the AC grid, as a result of which the aim of providing the minimum reserve power may already have been achieved. Possibly, however, achieving this aim requires the activation of more than one additional power source.

The activation of the additional power source(s) for observing the minimum reserve power and for keeping the operating point of the system former in the desired operating range is triggered, in one embodiment, by varying the supply of power by the power station. As a result, the power source controller "sees" a larger load that it needs to cover, which is the difference between the sum of the power consumptions of all loads connected to the AC grid, on the one hand, and the power supplied by the power station, on the other hand. Since the power source controller also keeps a minimum reserve power to hand, it accordingly activates one or more additional power sources. In this case, it may be advantageous if the power source controller assumes fundamentally approximately the same minimum reserve power as it takes into consideration when the power station is operated in accordance with the disclosure. When the power station is operated in accordance with the disclosure, however, no action is taken in the power source controller itself. It is merely necessary to know what power sources are currently activated, what maximum power these power sources could provide and how much power all power sources currently supply to the AC grid. This is a prerequisite for being able to ascertain the reserve power currently available in the AC grid.

In this embodiment of the method according to the disclosure for operating the power station, it is moreover possible, when the ascertained reserve power exceeds a maximium reserve power, for the supply of power by the power station to be increased until the at least one or the still further power source is deactivated by the power source controller. At least one power source used as a system former always remains active, however.

The maximum reserve power may also be a firmly prescribed value or can be prescribed on the basis of the reserve power that is currently actually needed. Furthermore, deactivation of one of the hitherto activated power sources also does not involve action being taken in the generator controller, but rather the power source controller is shown a reduced load that it has to cover and that prompts it to deactivate the power source. As such, power sources that are currently not needed are deactivated in favor of an increased supply of power by the power station. This can also comprise the deactivation of multiple power sources at the same time or in brief succession.

Overall, the method according to the disclosure ensures that although there are always as many power sources activated as are required for providing a useful reserve power, but not more power sources in order to maximize the supply of power by the power station for the purposes of stable operation of the AC grid. This approach has the direct consequence that when there is a higher power available from the power station, all currently activated power sources are used, where reasonably possible, only to provide reserve power, but not for the actual supply of power to the AC grid. The load to be borne by all power sources needs, in this case, only to be kept just high enough for the power source controller not to shut down any of the active power sources, which would reduce the available reserve power, and for the operating points of all system formers to be kept in their desired operating range.

In other words, when the ascertained reserve power is in the range between the minimum reserve power and the maximum reserve power, the supply of power by the power station can be maximized by observing the criterion that distinctly none of the further power sources are deactivated by the power source controller.

As has already been indicated, the method according to one embodiment of the disclosure involves the power consumption of all loads in the AC grid being detected. This can be carried out through direct measurement of the individual components of the power consumption or by detecting the individual components of the power output of all power sources, the power station and the system former.

The minimum reserve power and also the maximum reserve power can be computed using a percentage of the present power consumption of all loads as a summand. That is to say that the method according to the disclosure can involve the minimum and/or maximum reserve power rising as the power consumption of all loads rises, because fluctuations to be expected in the power consumption can behave in proportion to the power consumption.

Furthermore, the method according to the disclosure can involve not only the present power output but also the present capacity of the power station being detected. The difference between the present power output and the present capacity of the power station can be regarded at least in part as currently available reserve power.

The minimum reserve power and/or the maximum reserve power can comprise a percentage of the present power output of the power station as a summand, because there is the essential fear of a dip in this power output, for example as a result of an approaching cloud. The fact that such a power dip is relatively unlikely when the present power output is a long way below the present capacity is already sufficiently taken into consideration when the difference between these two values is used in the currently available reserve power, for example. In principle, this can also be taken into consideration for the minimum reserve power and/or the maximum reserve power, however.

Furthermore, the minimum reserve power and/or the maximum reserve power can be computed by taking into consideration time-dependent factors or summands that reflect particularly large fluctuations in the power consumption of all loads at particular times of day, for example.

For the maximum reserve power, it should furthermore be taken into consideration by how much the currently available reserve power falls when one of the currently active power sources is deactivated. By way of example, the maximum reserve power can be computed as the sum of the minimum reserve power and the maximum capacity of the currently active further power source, which would be deactivated by the generator controller first, multiplied by a stabilization factor greater than 1, in order that the currently available reserve power does not immediately drop below the minimum reserve power following deactivation of this power source.

The method according to the disclosure can additionally also involve the supply of power by the power station being reduced such that a longer-term drop below a minimum power output and any drop below a power output of zero is prevented for all power sources. The minimum power output of a power source is the power output from which regular operation, particularly with clean combustion of the fuel in a combustion generator, is possible, which is thus a prerequisite for a long life and long service intervals for the power source. There may be situations in which the power source controller cannot prevent even a longer-term drop below the minimum power output of one of more power sources, for example because a minimum activation time is stipulated for the power sources or because no further power sources can be shut down in order to observe the minimum reserve power taken into consideration by the power source controller. Under these constraints, it may make sense for the power supplied by the power station not to be maximized, but rather even to be scaled back, in order to keep the operating point of the system former in the desired operating range and to optimize the overall system.

The fast controllability of the power supplied by the power station can be used, according to the disclosure, particularly to prevent any drop below a power output of zero, i.e. a power consumption from all power sources other than battery inverters. Such a power consumption normally results in emergency shutdown in the case of combustion generators, for example. When a combustion generator is used as a system former, shutdown thereof results in the whole AC grid collapsing.

A control apparatus according to the disclosure for controlling a power station of fluctuating electrical capacity is designed to perform a method according to the disclosure. This includes the control apparatus comprising measuring devices of its own for capturing the measured values it needs and other information, insofar as it cannot request these measured values and this information from the generator controller, for example. By way of example, simple vibration sensors can be provided on the individual combustion generators as further power sources in order to detect which of these are currently activated. Additionally, it is then necessary to detect at least the power consumption of all loads in the AC grid directly or indirectly. When the present power outputs of the individual power sources are available, it is therefore already clear which are currently activated, and then only values from the power station, to which the control apparatus is connected anyway, are additionally needed.

The power station of fluctuating electrical capacity operated according to the disclosure may be a wind, tidal or a cogeneration unit. In particular, it is a photovoltaic power station. A photovoltaic power station according to the disclosure has a control apparatus according to the disclosure.

Advantageous developments of the disclosure are evident from the patent claims, the description and the drawings. The advantages of features and of combinations of a plurality of features as mentioned in the description are merely by way of example and may take effect alternatively or cumulatively, without the advantages necessarily having to be achieved by embodiments according to the disclosure. Without the subject matter of the appended patent claims being altered hereby, the following holds true with regard to the disclosure content of the original application documents and the patent: further features can be gathered from the drawings—in particular the relative arrangements and operative connections shown for a plurality of component parts. The combination of features of different embodiments of the disclosure or of features of different patent claims is likewise possible deviating from the chosen dependency references in the patent claims and is suggested hereby. This also concerns such features as are illustrated in separate drawings or are mentioned in the description thereof. These features can also be combined with features of different patent claims. Similarly, features present in the patent claims may be omitted for further embodiments of the disclosure.

The features mentioned in the patent claims and the description should be understood in respect of their number such that exactly this number or a greater number than the number mentioned is present without the need for explicit use of the adverb "at least". Therefore, when "an element" is discussed, for example, this should be understood to mean that exactly one element, two elements or more elements are present. This also applies when, besides the "one element", "at least one other element" is also discussed in the same context. The cited features can also be augmented by other features or may be the only features of which the respective product consists.

The reference symbols contained in the patent claims do not constitute any restriction of the scope of the subjects protected by the patent claims. They merely serve the purpose of making the patent claims more easily understandable.

BRIEF DESCRIPTION OF THE FIGURES

The disclosure is explained and described in greater detail below on the basis of the appended figures.

DETAILED DESCRIPTION

Figure 1:
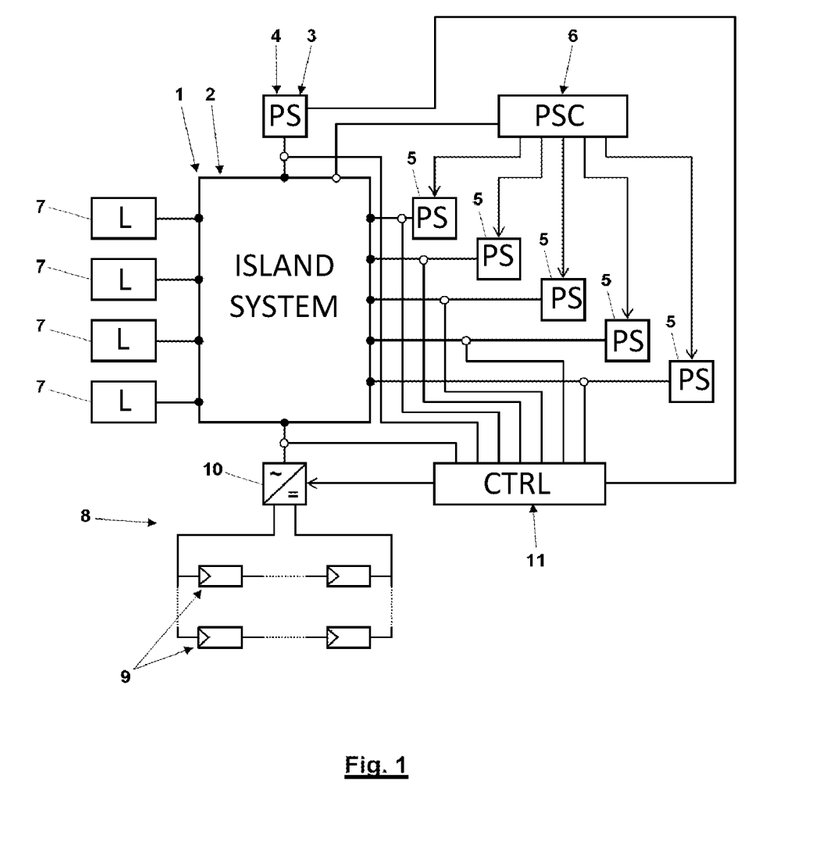
FIG. 1 shows a block diagram of an island system to which a photovoltaic power station, besides a system former in the form of a combustion generator, further power sources in the form of combustion generators and multiple loads, is connected.

An AC grid 1 depicted schematically in FIG. 1 is an island system 2, i.e. a limited AC grid without connection to an external AC grid having almost unlimited capacity in comparison with the power consumption in the AC grid. The AC grid 1 has a voltage-setting system former 3 connected to it that prescribes the frequency and amplitude of a mains voltage of the AC grid 1. In the present case, the system former 3 is a power source (PS) 4 in the form of a combustion generator. A combustion generator is in this case intended to be understood to mean the combination of an internal combustion engine, particularly a diesel engine, with an electric machine, which is operated as a generator.

Further power sources (PS) 5 connected to the AC grid 1 are likewise combustion generators in this case, and they are activated and also deactivated by a power source controller (PSC) 6 as required, i.e. depending on the supply of power in the AC grid 1 and the power consumption of loads (L) 7 that are connected to the AC grid 1. Additionally, the power output of all activated power sources 4, 5 is varied as required. This can be performed by control devices of the individual power sources 5 that are geared to one another such that the total power output is distributed uniformly over all activated power sources 4, 5.

In order to reduce a fuel consumption of all combustion generators or more generally a consumption of nonregenerative energy by all power sources 4 and 5, a power station 8 is provided that supplies electric power to the AC grid 1 from photovoltaic generators 9 via one or more inverters 10. In this case, the power supplied by the power station 8 is stipulated by a control apparatus (CTRL) 11 such that the result is optimized operation of the overall system shown in FIG. 1. This optimized operation is characterized by the following features, inter alia:

At any time, an operating point of the system former 3 and of all simultaneously activated voltage-setting power sources 5 is in a desired operating range in which the power sources 4, 5 are able to efficiently correct fluctuations arising in the mains voltage of the AC grid 1.

At any time, a sufficient reserve power particularly in the power sources 4 and 5, but, depending on the design, also including the power station 8, is available in order to cover increases in the power consumption of the loads 7 that are to be expected. Depending on the present workload of the power station 8, this reserve power can also be used to compensate for dips in the power output of the power station 8, for example caused by the approach of a cloud.

Neither of the power sources 4, 5 is operated for some time below a minimum power output that is required for clean combustion of the fuel and accordingly for low-maintenance operation of the combustion generators used as power sources 4, 5.

Power is supplied to neither of the power sources 4 and 5, which would entail the risk of damage to the respective power sources and which would typically cause the combustion generator to immediately shut down. If the combustion generator of the system-forming source 3 were shut down, this would result in the AC grid 1 collapsing.

Under the above constraints, a maximum amount of electric power is supplied to the AC grid 1 from the power station 8, and hence the maximum amount of fuel is saved for the combustion generators used as power sources 4, 5.

The power output of the inverter 10 of the power station 8 can be varied very quickly, so that the control apparatus 11 shown in FIG. 1 can also correct very short-term fluctuations in the power consumption of the loads 7, so long as they do not become so large that they go beyond the present capacity of the power station 8. These short-term fluctuations in the power consumption thus do not get through to the combustion generators used as power sources 4, 5, which can equalize only slower power fluctuations on account of their mechanical moments of inertia. In this way, the power sources 4 and 5 are subjected to fundamentally lower loading by means of the power station 8, which results in further advantages for the overall system shown in FIG. 1, even if the capacity of the power station 8 is in most cases utilized only in part. Larger fluctuations in the power consumption of the loads 7 and resultant fluctuations in the amplitude and the frequency of the mains voltage of the AC grid 1 can be corrected only by involving the power sources 4, 5, however. So that this occurs efficiently, at least all voltage-setting power sources and hence particularly the system former 3 need to be in an operating range that is favorable for this correction of fluctuations in the mains voltage.

Figure 2:
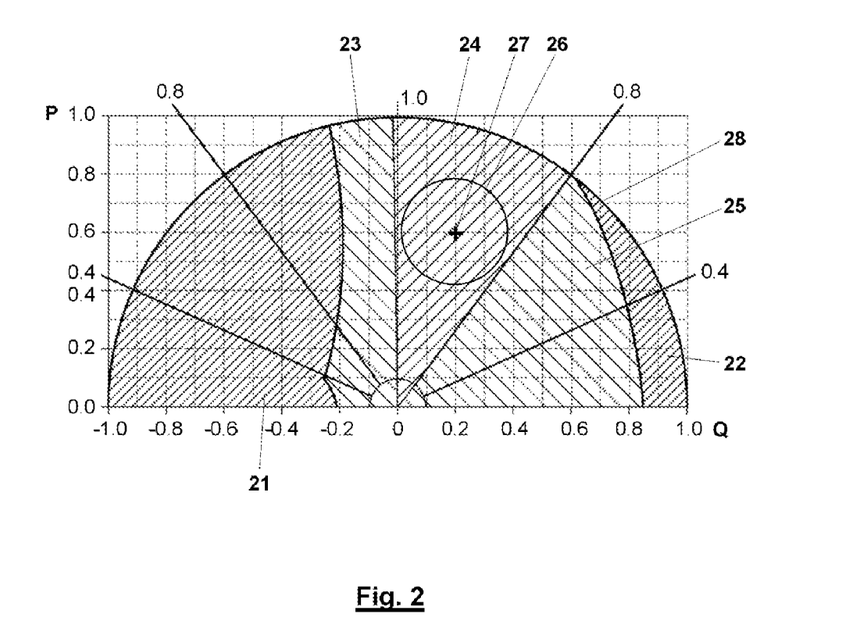
FIG. 2 shows various operating ranges for the system former shown in FIG. 1 in a depiction of the PQ level normalized to the rated power of said system former.

The operating range to be observed for the correction of fluctuations in the mains voltage by all voltage-setting power sources 4, 5 cannot be defined solely on the basis of the active power output by the power sources 4, 5, but rather needs to be stipulated both in relation to the output active power and in relation to the output reactive power. FIG. 2 is the plot of the active power P over the reactive power Q of a combustion generator used as a system former 3, i.e. in this case, in concrete terms, a synchronized machine driven by a diesel engine, for example. In this case, the units in which the reactive power Q and the active power P are specified are relative components of the rated or maximum power of the combustion generator. In other words, FIG. 2 is a reproduction of the PQ level normalized to the rated power of the combustion generator. The negative region of the x axis in the direction of the reactive power Q corresponds in this case to a negative phase angle between voltage and current, for which the current leads the voltage in the AC grid, while the positive region of the x axis corresponds to a positive phase angle with voltage leading the current. The straight lines running radially through each of the two quadrants of the PQ level from the origin correspond to power factors of 0.4 and 0.8. In an operating range 21 of the combustion generator, the mains voltage delivered by the latter is unstable. In an operating range 22, there is the threat of its electric machine overheating. Situated in-between are operating ranges 23 to 25, the mains voltage delivered by the combustion generator being particularly stable in the operating range 24 with a negative phase angle of maximum smallness up to a positive phase angle with a power factor of 0.8. Within the operating range 24, a desired operating range 26 is shown. When the combustion generator is within this desired operating range 26, it has its maximum capability of effectively equalizing fluctuations in the mains voltage of the AC grid 1, because shifts in its operating point 27 that arise in this case do not result in an unfavorable operating range 21, 22 or the power limit 28 that includes all possible operating ranges 21 to 26 being reached. The method according to the disclosure involves the operating point 27 of the system former 3 being kept in the desired range 26 by means of the supply of active power and reactive power using the power station 8. Since the power is distributed uniformly to all power sources 4, 5 in the case of power sources 4, 5 of the same kind, all other activated combustion generators also have their operating point 27 in the desired range 26 of the PQ level. Thus, overall, a high capacity is provided for effectively correcting fluctuations in the mains voltage of the AC grid 1. Keeping the operating point 27 of all power sources 4, 5 in the desired range 26 also results in an adequate reserve power always being available from the power sources 4, 5 in order to counter fluctuating power requirements of the loads 7.

Figure 3:
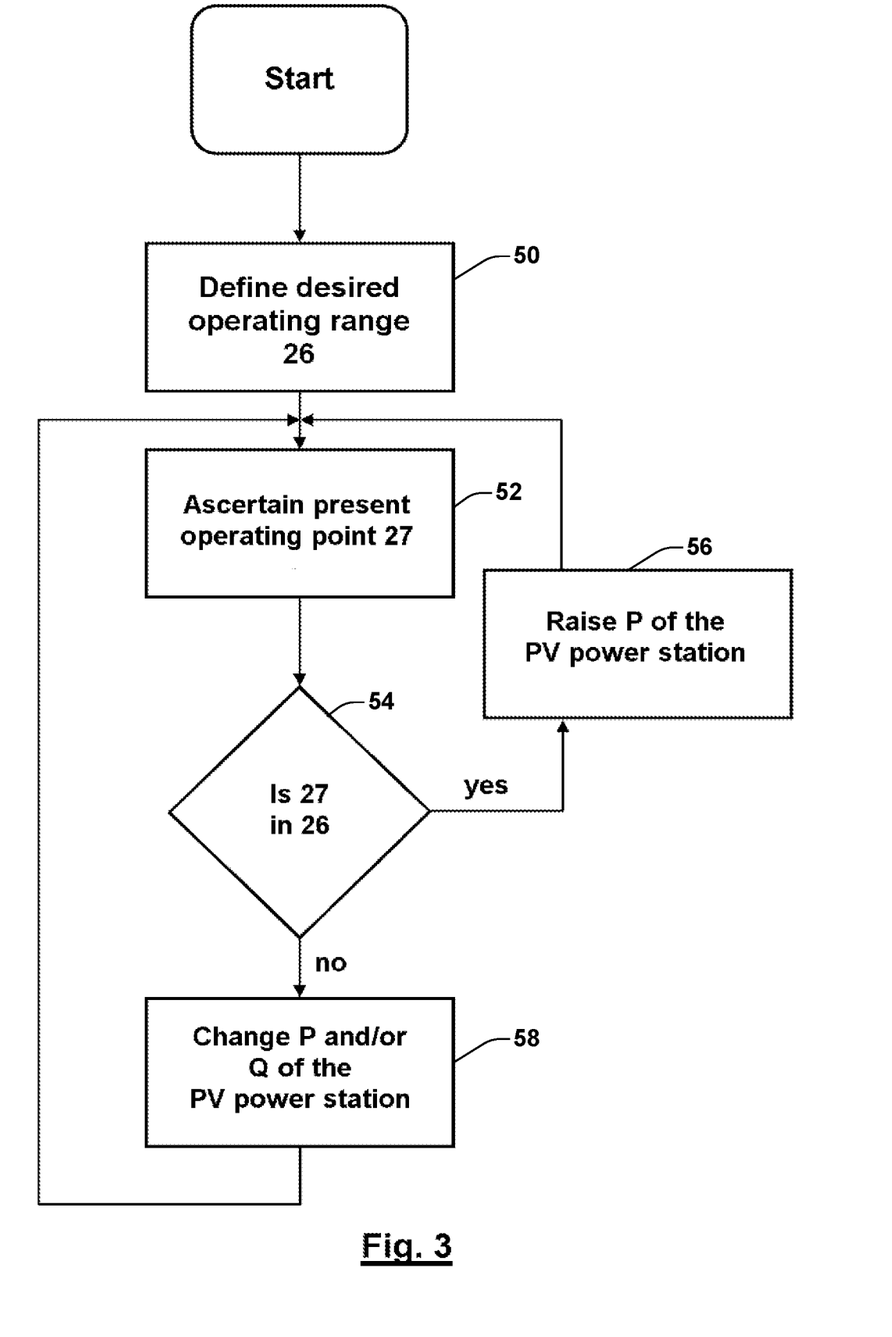
FIG. 3 shows a flowchart for the implementation of an embodiment of the method according to the disclosure.

The flowchart outlined in FIG. 3 shows the basic sequence of the method according to the disclosure. After starting, a desired operating range 26 is defined at 50. This may be an operating range that is fixed for the respective configuration of the AC grid 1, or this operating range is matched to the respective operating situation. The present operating point 27 of the system former 3 or of all voltage-setting power sources 4, 5 is then determined at 52. So long as the operating point 27 is within the desired operating range 26 (YES at 54), the active power P of the PV power station is raised at 56 in order to maximize the nonregenerative energy saved by means of the power station 8 because it is not consumed by the power sources 4, 5. If, by contrast, the operating point 27 is not within the desired operating range 26 (NO at 54), then the active power P and/or reactive power Q supplied to the AC grid 1 by the PV power station is changed at 58 such that the operating point 27 is returned to the desired operating range 26. Changing particularly the active power P of the PV power station 8 can be used not only to directly shift the operating point 27 of the system former 3 but also to prompt the power source controller 6 to activate or deactivate power sources 5 and thereby to effect the desired shift of the operating point 7 back to the desired operating range 26. In this way, an average power, i.e. a power averaged over all power sources 5, is already kept within advantageous limits both in relation to its active power component and in relation to its reactive power component. Additionally, the reserve power that is available for supplying power to the loads 7 connected to the AC grid 1 can also be separately monitored and readjusted if needed.

Figure 4:
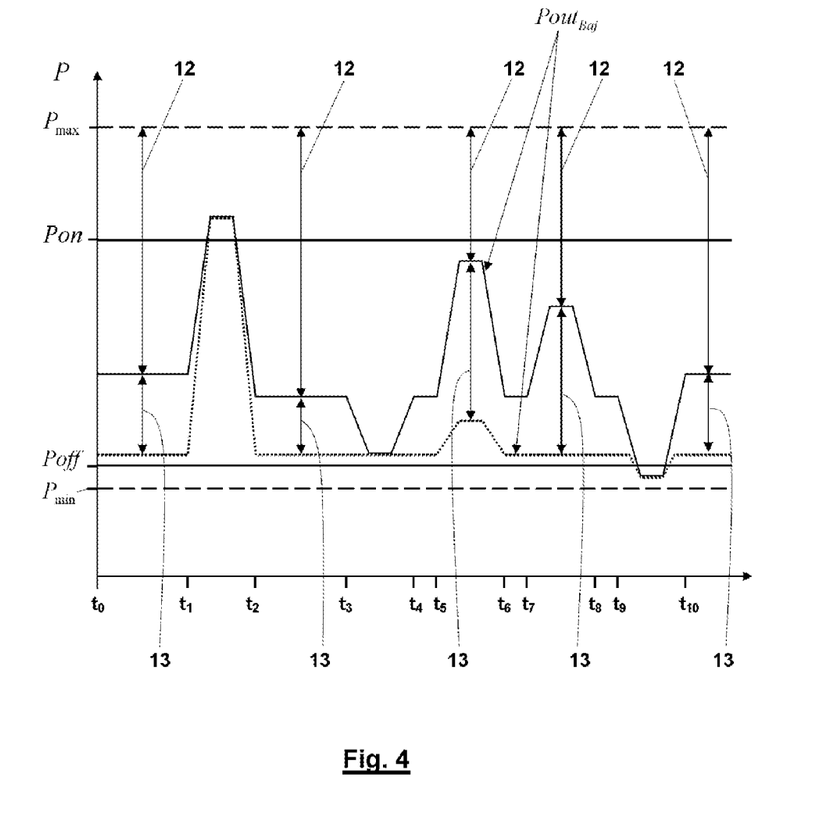
FIG. 4 is a plot of a time profile for an average power $\overline{Pout}_{Baj}$ of the combustion generators shown in FIG. 1.

FIG. 4 shows a time profile for an average power output $\overline{P}out_{Baj}$ of all currently activated power sources 4 and 5 shown in FIG. 1. Besides this average power, FIG. 4 shows a maximum power Pmax and the minimum power output Pmin to represent the limits in which the average power $\overline{P}out_{Baj}$ should be kept in each instance. Furthermore, a power Pon and a power Poff are shown, which mark the maximum workload of the power sources and the minimum workload of the power sources at which the power source controller 6 shown in FIG. 1 activates an additional power source and deactivates one of the currently active power sources, respectively. In the example on which FIG. 2 is based, it is assumed that the values of Pmax, Pmin, Pon and Poff are the same for all power sources 4 and 5 shown in FIG. 1, however, in an alternative embodiment these values may differ for the different sources 4 and 5.

The profile of $\overline{P}out_{Baj}$ is rendered once with a solid line in FIG. 4 in order to depict the situation that would arise without a supply of power from the power station 8 as shown in FIG. 1. A dotted line depicts the profile of $\overline{P}out_{Baj}$ that is obtained when power is supplied by the power station 8 under the control of the control apparatus 11 as shown in FIG. 1.

In a first period between a time $t_0$ and a time $t_1$, the average power output $\overline{P}out_{Baj}$ would, without the support of the power station, admittedly be distinctly below Pon, but also distinctly above Poff. That is to say that there is sufficient power reserve between $\overline{P}out_{Baj}$ and Pmax, which is illustrated by the distance 12 in this case. The distance 12 is not directly the power reserve in the AC grid 1 shown in FIG. 1, but rather it also needs to be multiplied by the number of currently active power sources for this purpose. In addition, it does not take into consideration any power reserve of the power station 8. Additional supply of power by the power station 8 lowers $\overline{P}out_{Baj}$ to a value just a little above Poff. This power of the power station is illustrated by the distance 13, which likewise also needs to be multiplied by the number of active power sources in order to represent the supply of power by the power station as a whole, however. The distance 13 indicates how much fuel can be saved by the power station in each active combustion generator used as a power source.

After the time $t_1$, the power consumption of the loads and hence the power output of the power sources in the AC grid rises. In this case $\overline{P}out_{Baj}$ exceeds the value of Pon, without taking the power station into consideration. This is an indication that a further power source needs to be activated in order to maintain the necessary power reserve. So that this signal is not rejected in the generator controller 6 shown in FIG. 1, the supply of power by the power station 8 is scaled down by the control apparatus 11. In the present case, the supply is even returned to zero. This is synonymous with the capacity of the power station 8 not being included in the power reserve (which could fundamentally occur). The exceeding of Pon and the corresponding activation of an additional power source 5 subsequently lower the average power output $\overline{P}out_{Baj}$ of all power sources, so that it is robustly lower than Pon at a time $t_2$ (the power ratios depicted correspond to the case in which, before $t_1$, only the power source 4, i.e. the system former 3, was activated as shown in FIG. 1, and the power source controller 6 activates one of the power sources 5 after $t_1$). Since the power reserve is now adequate again, it is now possible for power to be supplied by the power station 8 again, as indicated by a newly arising distance 13. At a time $t_3$, the power consumption of the loads in the AC grid decreases. This reversal is substantially compensated for by virtue of the power supplied by the power station 8 being scaled back. This prevents $\overline{P}out_{Baj}$ from dropping below Poff and one of the currently active power sources being switched off, because all combustion generators are needed for the desired reserve power. At a time $t_4$, the power consumption has risen to its previous extent again, before it rises further at a time $t_5$, but without exceeding Pon again. This rise is, insofar as the capacity of the power station so allows, compensated for by the supply of additional power by the power station. This is not possible fully in this case, however, which means that the power $\overline{P}out_{Baj}$ that remains following compensation (dashed line) also exhibits a certain rise. At $t_6$, the power consumption has returned to its earlier value again, before it rises again at $t_7$, this time a little less than between $t_5$ and $t_6$, so that additional supply of power by the power station can keep $\overline{P}out_{Baj}$ just above Poff. At $t_8$, the previous value of the power consumption has been reached again, until it dips at $t_9$, specifically this time to below Poff. In this case, the supply of power by the power station is scaled back as soon as Poff has been undershot, in order to prevent Pmin from also being undershot. As a result of Poff being undershot, one of the hitherto active power sources is deactivated. This causes $\overline{P}out_{Baj}$ to rise up to a time $t_{10}$ from which considerable power can again be supplied by the power station, this being indicated by the distance 13.

Figure 5:
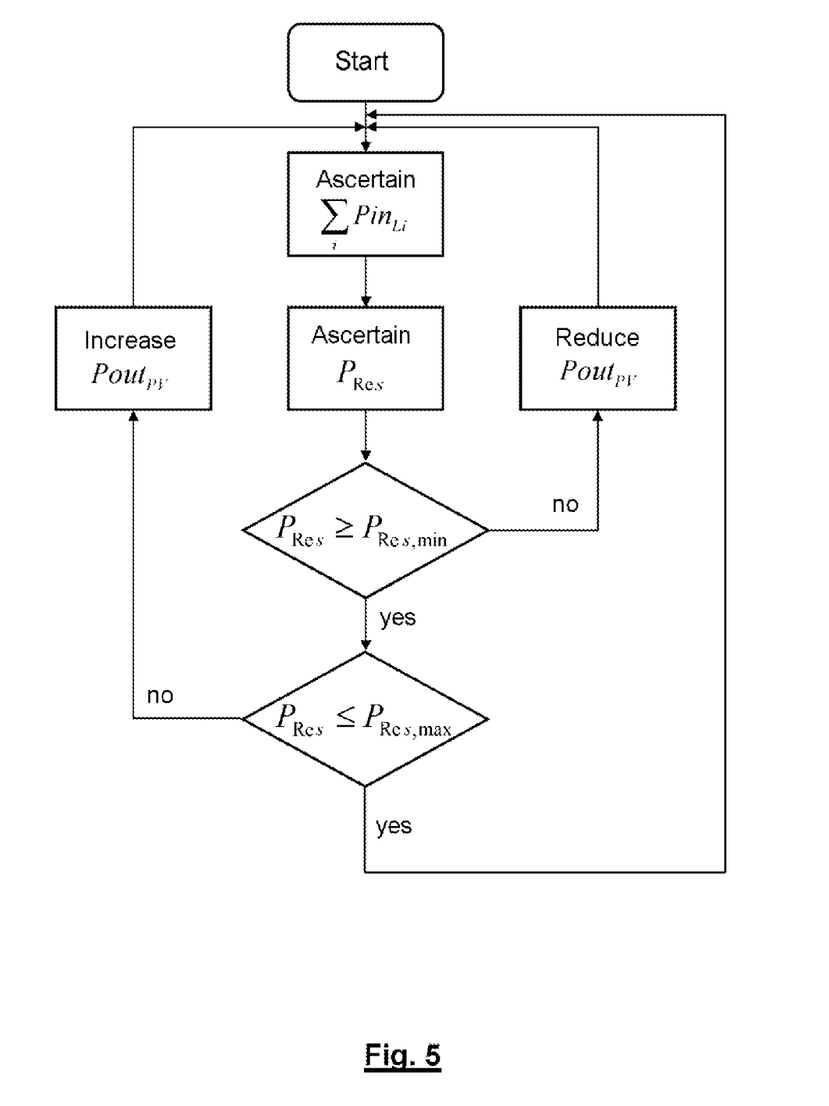
FIG. 5 is a flowchart for the implementation of a further routine of the method according to the disclosure.

The routine outlined by a flowchart in FIG. 5, which routine can be implemented by a control apparatus 11 according to the disclosure as shown in FIG. 1, is not identical to the procedure explained on the basis of FIG. 4, even although there are broad correspondences. The routine begins by ascertaining the total power consumption of all loads 7. In this case, the following holds true:

$$\sum_i Pin_{Li} = Pout_{NB} + \sum_j Pout_{Baj} + Pout_{PV},$$

where $Pin_{Li}$ is the power consumption of the i-th load 7, $Pout_{NB}$ is the power output of the system former 3, $Pout_{Baj}$ is the power output of the activated j-th power source 5 and $Pout_{PV}$ is the power output of the power station 8 shown in FIG. 1.

On the basis of this, the reserve power $P_{Res}$ currently available in the AC grid 1 is ascertained in the next step. This can be accomplished in accordance with the following formula:

$$P_{Res} = P\max_{NB} + \sum_j P\max_{Baj} + s * P\max_{PV} - \sum_i Pin_{Li}.$$

In this case, $P\max_{NB}$ is the maximum capacity of the system former 3, $P\max_{Baj}$ is the maximum capacity of the activated j-th power source, $P\max_{PV}$ is the maximum capacity of the power station, and s is a safety factor that takes into consideration that $P\max_{PV}$ is subject to fluctuations, for example as a result of approaching cloud cover.

Subsequently, a check is performed to determine whether $P_{Res}$ is larger than a desired minimum power reserve $P_{Res,min}$. This minimum reserve power can be set as a constant value. In the approach as has been explained on the basis of FIG. 4, the minimum reserve power rises with the sum of the power consumptions of the individual loads. Furthermore, it may make sense to have a component of the present power output of the power station included in the minimum reserve power, if the power station is operated close to its maximum capacity. As such, $P_{Res,min}$ can be represented particularly by the following sum:

$$P_{Res,min} = c + v * \sum_i Pin_{Li} + r * Pout_{PV}.$$

In this case, c is a constant, v is a variability factor, and r is a risk factor. c, v and r may also be zero. At least one of these values, for example, c or v, is greater than zero, however.

If the present reserve power drops below the minimum reserve power, then, insofar as power $Pout_{PV}$ is currently supplied to the AC grid by the power station, this supply is reduced until the power source controller activates an additional power source. The method sequence is then started over.

Otherwise, it is checked that the currently available reserve power does not exceed a maximum reserve power $P_{Res,max}$. This exceeding indicates that currently too many power sources are activated. For the value of the maximum reserve power $P_{Res,max}$, the following can hold true:

$$P_{Res,max} = P_{Res,min} + k * P\max_{Baj}.$$

In this case, k is a stabilization factor that is greater than 1, and $P\max_{Baj}$ is the maximum power output of the j-th power source that has been deactivated on $P_{Res,max}$ being exceeded. With this deactivation, the reserve power would fall exactly by $P\max_{Baj}$. In this case, the stability factor k ensures that this fall does not mean that $P_{Res,min}$ is immediately undershot, since this would result in the same power source immediately being switched on again, etc.

Different variations of the method are possible particularly in relation to taking the capacity of the power station into consideration. It is thus possible for a currently unutilized capacity of the power station to be included in the power reserve; alternatively, this can be deliberately forborne owing to the uncertainty as to whether the capacity persists. Even if the unutilized capacity of the power station is not included in the power reserve, it may make sense to take into consideration the power currently supplied by the power station when prescribing the minimum reserve power. The reason is that this power can also disappear, even if the capacity of the power station is currently not completely exhausted. The manner of taking this into consideration can also be made dependent on weather forecasts, the season, the time of day and/or the site of the power station.

The invention claimed is:

1. A method for operating a power station of fluctuating electrical capacity that, besides a voltage-setting system former outputting active power and reactive power and at least one load, is connected to a limited AC grid, comprising:
    defining a desired self-contained operating range of the system former on the PQ level, in which operating range the system former is able to efficiently correct fluctuations arising in a mains voltage of the AC grid,
    ascertaining a present operating point of the system former on the PQ level, and
    controlling an output of active power and reactive power by the power station such that the operating point of the system former is kept in the desired operating range.

2. The method as claimed in claim 1, further comprising maximizing a supply of active power by the power station while the operating point of the system former remains in the desired operating range.

3. The method as claimed in claim 1, wherein the system former comprises a hydroelectric generator or a combustion generator or a battery inverter.

4. The method as claimed in claim 3, further comprising:
    increasing the supply of power by the power station when the ascertained reserve power ($P_{Res}$) exceeds a maximum reserve power ($P_{Res,max}$), until the at least one or the still further power source is deactivated by the power source controller; and
    maximizing the supply of power by the power controller when the ascertained reserve power ($P_{Res}$) is in the range between the minimum reserve power ($P_{Res,min}$) and the maximum reserve power ($P_{Res,max}$), only for as long as no further power source is deactivated by the power source controller.

5. The method as claimed in claim 4, wherein a present power consumption (Pin) of all loads in the AC grid is detected directly or as a present power output $$\left( \sum_j Pout_{Baj} + Pout_{PV} + Pout_{NB} \right)$$

of all power sources.

6. The method as claimed in claim 5, wherein the minimum reserve power ($P_{Res,min}$) or the maximum reserve power ($P_{Res,max}$), or both are computed using a percentage of the present power consumptions (Pin) of all loads as a summand.

7. The method as claimed in claim 1, further comprising activating or deactivating at least one further power source connected to the limited AC grid as required in order to keep the operating point of the system former in the desired operating range.

8. The method as claimed in claim 7, wherein the at least one further power source comprises a combustion generator.

9. The method as claimed in claim 7, wherein the at least one further power source is activated and deactivated by a power source controller and the supply of active power by the power station is reduced until the at least one or another further power source is activated by the power source controller when the operating point of the system former leaves the desired operating range.

10. The method as claimed in claim 9, wherein the supply of power by the power station is increased until the at least one or the still further power source is deactivated by the power source controller when the operating point of the system former leaves the desired operating range.

11. The method as claimed in claim 7, further comprising ascertaining a reserve power ($P_{Res}$) currently available in the AC grid, wherein only activated power sources are taken into consideration, and when the ascertained reserve power ($P_{Res}$) drops below a minimum reserve power ($P_{Res,min}$), reducing the supply of power by the power station until the at least one or another further power source is activated by the power source controller.

12. The method as claimed in claim 11, further comprising increasing the supply of power by the power station when the ascertained reserve power ($P_{Res}$) exceeds a maximum reserve power ($P_{Res,max}$), until the at least one or the still further power source is deactivated by the power source controller.

13. The method as claimed in claim 12, further comprising computing the maximum reserve power ($P_{Res,max}$) as a sum of the minimum reserve power ($P_{Res,min}$) and the maximum capacity of the further power source ($Pmax_{Baj}$), which the generator controller (6) would deactivate first, times a stabilization factor (k) greater than 1.

14. The method as claimed in claim 11, further comprising:
 detecting a present power output ($Pout_{PV}$) and the present capacity ($Pmax_{PV}$) of the power station; and
 stipulating currently available reserve power ($P_{Res}$) by taking into consideration a percentage of a difference between the present capacity ($Pmax_{PV}$) and the present power output ($Pout_{PV}$) of the power station.

15. The method as claimed in claim 14, further comprising:
 increasing the supply of power by the power station when the ascertained reserve power ($P_{Res}$) exceeds a maximum reserve power ($P_{Res,max}$), until the at least one or the still further power source is deactivated by the power source controller; and
 computing the minimum reserve power ($P_{Res,min}$) or the maximum reserve power ($P_{Res,max}$), or both using a percentage of the present power output ($Pout_{PV}$) of the power station as a summand.

16. The method as claimed in claim 1, further comprising detecting a present power output ($Pout_{PV}$) and the present capacity ($Pmax_{PV}$) of the power station.

17. The method as claimed in claim 1, further comprising preventing a longer-term drop below a minimum power output (Pmin) and any drop below a power output of zero for all power sources by reducing the supply of power by the power station.

18. A control apparatus for controlling a power station that, besides at least one voltage-setting system former outputting active power and reactive power and at least one load, is connectable to a limited AC grid, wherein the control apparatus is configured to:
 define a desired self-contained operating range of the system former on the PQ level, in which operating range the system former is able to efficiently correct fluctuations arising in a mains voltage of the AC grid,
 ascertain a present operating point of the system former on the PQ level, and
 control an output of active power and reactive power by the power station such that the operating point of the system former is kept in the desired operating range.

19. A control apparatus for controlling a power station that, besides at least one voltage-setting system former outputting active power and reactive power, at least one further power source and at least one load, is connectable to a limited AC grid, wherein the at least one further resource outputting power is activated or deactivated as required, wherein the control apparatus is configured to:
 define a desired self-contained operating range of the system former on the PQ level, in which operating range the system former is able to efficiently correct fluctuations arising in a mains voltage of the AC grid,
 ascertain a present operating point of the system former on the PQ level,
 control an output of active power and reactive power by the power station such that the operating point of the system former is kept in the desired operating range,
 activate or deactivate at least one further power source connected to the limited AC grid as required in order to keep the operating point of the system former in the desired operating range.

* * * * *